United States Patent
Matarazzo et al.

(10) Patent No.: US 12,437,392 B2
(45) Date of Patent: Oct. 7, 2025

(54) MOBILE SENSING SYSTEM FOR CROP MONITORING

(71) Applicant: ADAVIV, Somerville, MA (US)

(72) Inventors: Thomas James Matarazzo, Astoria, NY (US); Mohammad Mahmoudzadehvazifeh, Medford, MA (US); Ian Shaun Seiferling, Somerville, MA (US)

(73) Assignee: AdaViv, Somerville, MA (US)

( * ) Notice: Subject to any disclaimer, the term of this patent is extended or adjusted under 35 U.S.C. 154(b) by 0 days.

(21) Appl. No.: 17/758,411

(22) PCT Filed: Jan. 5, 2021

(86) PCT No.: PCT/US2021/012183
§ 371 (c)(1),
(2) Date: Jul. 6, 2022

(87) PCT Pub. No.: WO2021/141896
PCT Pub. Date: Jul. 15, 2021

(65) Prior Publication Data
US 2023/0026679 A1    Jan. 26, 2023

Related U.S. Application Data

(60) Provisional application No. 62/967,227, filed on Jan. 29, 2020, provisional application No. 62/957,644, (Continued)

(51) Int. Cl.
*G06T 7/00*        (2017.01)
*A01B 69/04*       (2006.01)
(Continued)

(52) U.S. Cl.
CPC ......... *G06T 7/0012* (2013.01); *A01B 69/008* (2013.01); *A01M 7/0089* (2013.01);
(Continued)

(58) Field of Classification Search
CPC ......... G06T 7/0012; G06T 2207/30004; G06T 2207/30188; A01B 69/008; A01M 7/0089;
(Continued)

(56) References Cited

U.S. PATENT DOCUMENTS

2014/0035752 A1    2/2014 Johnson
2017/0030877 A1*   2/2017 Miresmailli ........ A01M 21/043
(Continued)

FOREIGN PATENT DOCUMENTS

CA        3125709 A1     7/2019
KR     10-1811640 B1    12/2017
WO    WO-2018107242 A1   6/2018

OTHER PUBLICATIONS

Massimo et al, ("Finely-grained annotated datasets for image-based plant phenotyping", Pattern Recognition Letters, 2015 Elsevier, pp. 80-89) (Year: 2015).*

(Continued)

*Primary Examiner* — Amara Abdi
(74) *Attorney, Agent, or Firm* — Womble Bond Dickinson (US) LLP; John V. Forcier

(57) ABSTRACT

Described herein are mobile sensing units for capturing raw data corresponding to certain characteristics of plants and their growing environment. Also described are computer devices and related methods for collecting user inputs, generating information relating to the plants and/or growing environment based on the raw data and user inputs, and displaying same.

7 Claims, 10 Drawing Sheets

Related U.S. Application Data filed on Jan. 6, 2020, provisional application No. 62/957,640, filed on Jan. 6, 2020.

(51) Int. Cl.

| | |
|---|---|
| *A01M 7/00* | (2006.01) |
| *B64C 39/02* | (2023.01) |
| *G01N 33/00* | (2006.01) |
| *G05D 1/00* | (2006.01) |
| *G06F 3/04847* | (2022.01) |
| *G06V 10/70* | (2022.01) |
| *G06V 10/77* | (2022.01) |
| *G06V 10/774* | (2022.01) |
| *G06V 20/10* | (2022.01) |
| *B64U 101/00* | (2023.01) |
| *G06V 10/82* | (2022.01) |

(52) U.S. Cl.
CPC ....... *B64C 39/024* (2013.01); *G01N 33/0098* (2013.01); *G05D 1/0219* (2013.01); *G06F 3/04847* (2013.01); *G06V 10/768* (2022.01); *G06V 10/7715* (2022.01); *G06V 10/774* (2022.01); *G06V 20/188* (2022.01); *B64U 2101/00* (2023.01); *G06T 2207/30004* (2013.01); *G06T 2207/30188* (2013.01); *G06V 10/82* (2022.01); *G06V 2201/06* (2022.01)

(58) Field of Classification Search
CPC .............. B64C 39/024; G01N 33/0098; G05D 1/0219; G06F 3/04847; G06V 10/768; G06V 10/7715; G06V 10/774; G06V 20/188; G06V 10/82; G06V 2201/06; B64U 2101/00; A01D 46/30; H04N 7/181; G06Q 10/0637; G06Q 50/02; A01G 7/00

See application file for complete search history.

(56) References Cited

U.S. PATENT DOCUMENTS

| | | | |
|---|---|---|---|
| 2017/0032509 A1 | 2/2017 | Mannar et al. | |
| 2018/0039389 A1 | 2/2018 | Martyn | |
| 2018/0259496 A1* | 9/2018 | McPeek | G01N 33/025 |
| 2019/0259108 A1 | 8/2019 | Bongartz et al. | |
| 2020/0184153 A1* | 6/2020 | Bongartz | A01G 9/249 |
| 2020/0333782 A1* | 10/2020 | Kent | G05D 1/0022 |

OTHER PUBLICATIONS

Marko et al, ("Solving Current Limitations of Deep Learning Based Approaches for Plant Disease Detection", Jul. 2019, pp. 1-21) (Year: 2019).*

European Patent Office, Supplementary European Search Report dated Dec. 22, 2023, pp. 1-7.

David Story et al., Lettuce calcium deficiency detection with machine vision computed plant features in controlled environments. Computers and Electronics in Agriculture, vol. 74, issue 2, Nov. 2010.

Massimo Minervini et al., Finely-grained annotated datasets for image-based plant phenotyping. Article in Pattern Recognition Letters, DOI:10.1016/j.patrec.2015.10.013, Nov. 2015.

Marko Arsenovic et al., Solving Current Limitations of Deep Learning Based Approaches for Plant Disease Detection, Symmetry 2019, vol. 11, issue 939, DOI: 10.3390/syml 1070939, Jul. 19, 2019.

World Intellectual Property Office, International Preliminary Report on Patentability for PCT/US2021/012183, Jul. 12, 2022, pp. 1-8.

World Intellectual Property Office, International Preliminary Report on Patentability for PCT/US2021/012184, Jul. 12, 2022, pp. 1-6.

* cited by examiner

MOBILE SENSING SYSTEM FOR CROP MONITORING

CROSS-REFERENCE TO RELATED APPLICATIONS

This application is a national stage filing under 35 U.S.C. 371 of PCT/US2021/012183 filed Jan. 5, 2021, and claims priority to and the benefit of U.S. Provisional Application Nos. 62/957,640, filed Jan. 6, 2020, 62/957,644, filed Jan. 6, 2020, and 62/967,227, filed Jan. 29, 2020, the entire disclosures of which are hereby incorporated by reference herein in their entireties.

FIELD OF INVENTION

This disclosure relates to automated systems and methods for monitoring, evaluating, and cultivating crops.

BACKGROUND

Agriculture is the science and art of cultivating plants and livestock. With respect to the production of fruits, vegetables, and other crops, intensive manual labor is required to perform the tedious and often costly processes of farming. In addition, successful farming also relies on the experience and manual observation of experienced growers to identify and improve the quantity and quality of crops produced, for example, by managing growth cycles, environmental impacts, planting and harvesting timelines, disease prevention, etc. All of which, are time-consuming and prone to human error.

Accordingly, it would be advantageous to incorporate automated systems and processes, along with machine learning, to cultivate crops by, for example, monitoring, treating, and harvesting the crops, along with communicating with growers regarding the same.

SUMMARY

Disclosed herein are mobile sensing units for capturing raw data corresponding to certain characteristics of plants and their growing environment. Also disclosed are computer devices and related methods for collecting user inputs, generating information relating to the plants and/or growing environment based on the raw data and user inputs, and displaying same. The systems and methods described herein are configured to provide insights to a grower (or other user), such as, for example, environmental and plant conditions relating to at least one of temperature, plant health status, plant stress status, disease, pests, plant performance, growth status and plant structure, yield predictions, facility mapping, cultivation task records and procedures, diagnostic information related to the mobile sensing unit, the facility, and/or the plants (e.g., a proposed course of action relative a plant, such as more water, apply pesticide, etc.), and temporal and historical data related to all of the foregoing.

In one aspect, the disclosure relates to a crop monitoring system. The system includes a mobile sensing unit including a sensor array and a computing device including a display screen configured to present a graphical user interface. The mobile sensing unit is configured to navigate arrangements (e.g., rows) of plants within a growing facility and generate optical data corresponding to the plants. The computing device is in communication with the mobile sensing unit. For example, the computing device can be mounted on the mobile sensing unit and hard-wired thereto or can be located remotely and communicate wirelessly. The computing device is configured to at least one of display the optical data, receive user input related to the optical data, generate and display user information about environmental and plant conditions within the growing facility, or receive user input to navigate the user information about environmental and plant conditions within the growing facility.

In another aspect, the disclosure relates to a crop monitoring system that includes a mobile sensing unit including a sensor array and a computing device comprising a processor, at least one memory module, an input device, and a communication module. In some embodiments, the computer device includes a wireless communication module and additional storage for providing pre-existing data from one or more databases. The mobile sensing unit is configured to navigate rows of plants within a growing facility and generate raw data corresponding to the plants. The computing device is in communication with the mobile sensing unit and configured to generate user information about environmental and plant conditions within the growing facility. The system further includes a graphical user interface in communication with at least one of the computing device or the mobile sensing unit. The graphical user interface is configured to display the user information about environmental and plant conditions within the growing facility and receive user input to navigate the user information about environmental and plant conditions within the growing facility.

In various embodiments, the graphical user interface is located remotely from the mobile sensing unit, such as outside a growing facility, at a master control room, or in a free-roaming mobile device. The graphical user interface can be used for, for example: navigation and operation of the mobile sensing unit, inputting meta-data, which can pertain to condition of plant at time of data capture or near time of; other meta-data on plant location, identification, environmental conditions, or task/maintenance conditions (e.g., plants have just been trimmed or moved or harvested); displaying results and feedback from the system that has been generated based on the input data and provide information on the plants and environments to be used to initiate a course of action by a user (e.g., either an operator of the mobile sensing unit or customer). The computing device can be a laptop or desktop computer, a portable micro-controller (e.g., a tablet, a Raspberry Pi, or a GPU-based computing device, such as NVIDEA Jetson) including a display, where the computing device is programmed to generate, either via software or hardware, graphical images and statistical data related thereto.

In various embodiments of the foregoing aspects, the sensor array includes at least one camera with a lens, and optionally a filter, to capture optical data at different frequency ranges. In some embodiments, the array uses a single camera, such as a FUR Blackfly S area scan camera or a BASLER Racer line scan camera, with multiple, interchangeable lenses and filters, such as, for example, an electronically-controlled filter wheel and band-pass and long-pass optical filters. The optical data captured can include images across visible and non-visible light spectra, thermal images, and environmental readings, such as, for example, at least one of: temperature, humidity, luminosity, radiation, magnetic field, particulate matter, and chemical compounds. In various embodiments, the array may include one or more cameras capable of capturing, for example, still images, time-lapsed images, moving images, thermographic (e.g., infrared) images, one-dimensional images, two-dimensional images, three-dimensional images, etc. In another embodiment, the mobile sensing unit is further configured to emit a light pulse to capture or otherwise sense a plant's response to at least one of visible or invisible light pulses. The sensor array may also include at least one of a depth sensor, a light sensor (e.g., a spectrometer), or a thermal sensor that can measure not just plant features, but also ambient conditions (e.g., facility temperature or light intensity/exposure). In a particular embodiment, the sensor array includes a thermal camera configured to generate a high-resolution map of temperature variations within the plants. In certain embodiments, the sensor array includes a swarm system of autonomous drones equipped with optical sensing devices, where each autonomous drone is configured to navigate the rows of the plants within the growing facility and capture optical data thereof.

In some embodiments, the mobile sensing unit can include a control arm, which can be used to adjust at least one of a height or an orientation angle of the sensor array. The control arm can also be configured to interact with at least one of the plants or an ambient environment. For example, the arm can be used to move or reposition a plant, apply a treatment to the plant (e.g., spraying a pesticide, adding water, etc.), or adjust an environmental aspect (e.g., facility parameter, such raising or lowering a temperature, initiating irrigation or feeding, applying a treatment, adjusting lighting, etc.). In some cases, the control arm and/or mobile sensing unit can be configured to interact with one or more actuators (e.g., linear or rotary actuators, such as a NACHI MZ07, or a NACHI SC500, or a WAYLEAD NEMA Motor, etc.), either manually or as triggered via a control system, installed within the growing facility to adjust at least one of plant spacing, location, orientation, facility parameter, etc. The actuators can be coupled to the bench, the plant, and/or the growing facility. In some embodiments, the benches (or other plant supporting structures) can be positioned on sliding rails or similar structure, where the actuators can be configured to "push" or otherwise move the benches. Additionally, these actuators can include various control systems, such as light controllers, irrigation/feeding systems, HVAC settings that can be included within the various systems described herein or integrated with the existing facility and equipment controller systems (e.g., hardware and software), such as Argus Titan II controller, Dosatron irrigation and nutrient delivery systems, Etatron eOne microdoser kit, or HVAC and software greenhouse automation systems, such as those available from Priva or Argus Controls.

In further embodiments, the mobile sensing unit can be navigated remotely by a user or navigate the growing facility according to one or more autonomous navigation algorithms. In some cases, the navigation can be altered based on data collected from the mobile sensing unit or from input received from a user via one of the graphical user interfaces that may be associated with the computing device.

In still another aspect, the disclosure relates to a crop monitoring system, such as those described herein, where the system includes robotic mechanisms configured to provide plant treatment based on any of the data captured or generated by the mobile sensing system, or insights generated thereby. These robotic mechanisms may include, for example, articulated robotic arms, Cartesian robots, drones, autonomous vehicles, humanoids, cable-driven parallel robots, etc. The robotic mechanisms may provide treatment based on a system for modelling flower growth to track the growth of individual flowers and flower features as described herein. For example, the model may identify an anomaly in the growth of the flowers on a particular plant, and then activate a robot to apply a treatment, reposition the plant, or change an environmental parameter as necessary. Additionally, the crop monitoring system may be integrated with one or more climate control systems, plant feeding/irrigation (fertigation), or treatment system within the growing facility and the data captured or generated by the mobile sensing system, or insights generated thereby, can be used to recommend particular growth parameters or environments and/or activate at least one of the climate control systems to modify a condition within the growth facility or a treatment to a crop, track and certify compliance with applicable regulations, or combinations thereof.

In additional embodiments, the crop monitoring system may include a vision-based system to predict flower or fruit quality (e.g., THC content and Terpene profiles, flavor profiles, ripeness, sugar content, content of other organic compounds) and/or an automated system to harvest and sort plants. The automated harvesting system may utilize the vision-based system (e.g., a scanner) and a conveyor system to transport (e.g., via the robotic mechanisms) plants or flowers to different destinations based on plant condition or quality. The crop monitoring systems described herein may include a multi-spectral imaging system to detect unacceptable levels of contaminants in soil, plant, and/or flowers. The systems may rely on a machine learning model configured to identify the unacceptable levels of contaminants (e.g., biological, such as microbial, yeast, virus, or inorganic, such as metals) in soil, plant, and/or flowers based on data from a multi-spectral imaging system and machine learning, which may encompass artificial intelligence and deep learning concepts, such as, for example, the use of classic neural networks.

The crop monitoring system can present the environmental and plant conditions within the growing facility via one of the graphical user interfaces disclosed above. This information can include information relating to at least one of: temperature, plant health status (e.g., healthy or sick, growth rate, etc.), plant stress status (e.g., an unfavorable condition or substance that affects a plant's metabolism, reproduction, root development, or growth; such as drought, wind, over irrigation, or root disturbance), disease (e.g., blight, canker, powdery mildew), pests (e.g., aphids, beetles, mites), plant performance (e.g., crop yield), growth status and plant structure (e.g., leaf and canopy density, branch density, biomass, height, etc.), or yield predictions. In certain embodiments, a user can interact with one of the graphical user interfaces in order to display the environmental and plant conditions within the growing facility at a large scale facility-level or a small scale bench-level. The graphical user interface, in particular the interface of the second aspect of the disclosure, can be configured to generate and present a grid-like map of the growing facility, including graphical indications of the environmental and plant conditions for individual zones within the growing facility; information related to cultivation task records and procedures; diagnostic information related to the mobile sensing unit, the facility, and/or the plants; and temporal and historical representations of the foregoing to identify trends.

In still further embodiments, the crop monitoring system includes a conveyor system (e.g., a belt and associated drive mechanisms, robots, motorized rails, etc.) configured to transport the plants to a plurality of locations, such as, for example, another bench within the facility or a location outside or proximate the growing facility, based on data captured from the mobile sensing unit. The system also includes a second sensing unit mounted on the conveyor system and configured to scan the plants traveling on the conveyor system. The second sensing unit can be mounted to the conveyor system using a movable robotic arm or an actuator and configured to capture at least one of two-dimensional or three-dimensional data at various aspects, such as, for example, lighting, focus, sensor position, or environmental condition. The conveyor system can be configured to manipulate the plants in order for the second sensing unit to capture data from various angles.

In yet another aspect, the disclosure relates to a computer-implemented method for processing crop information, the method implementing an application processing system for use in generating and processing information related to environmental and plant conditions within a growing facility and displaying same. The method includes generating raw data via a mobile sensing unit, where the raw data corresponds to one or more characteristics of one or more plants; receiving user input information in one of multiple available input formats through an input interface; processing the raw data and user input information to create a curated data set that includes processed images representative of the crop information; comparing the curated data set against a pre-existing database of domain data; determining, based at least in part on the comparison of the curated data set, the specific environmental and plant conditions relative to the crop being processed; generating a graphical user interface using a GUI generator; and displaying the information related to the environmental and plant conditions.

In various embodiments of the method, the graphical user interface is interactive and the method further includes manipulating displayed information. In addition, a user will have the capability of "marking events," which can include an analysis of some of all of the raw data through which specific time stamps of interest are deemed to include "significant" or "abnormal" events. Such events can pertain directly to values measured by one or multiple sensors.

In still another aspect, the disclosure relates to a computer-implemented system for presenting information related to environmental and plant conditions within a growing facility. The system includes a mobile sensing unit including a sensor array and configured to navigate and arrangement of plants within a growing facility and generate raw data corresponding to the plants; an input interface for accepting user input information in one of multiple available input formats; application processing components; and a graphical user interface generator for mediation between the user and application processing components and displaying same. The computer processor components are programmed to perform the steps of collecting the raw data and user input information, validating the data and information, automatically selecting one or more decision engines based on the user input information and a pre-existing database of domain data, selecting a required format corresponding to the selected decision engine from a plurality of available formats stored in a library of decision engine proxies, converting the raw data and user input information into application data according to the corresponding required format, and routing the application data to the one or more selected decision engines to process the application data; generating information related to environmental and plant conditions within the growing facility.

In various embodiments, the computing device includes a display screen, the computing device being configured to display on the screen a menu listing one or more environmental or plant conditions relating to a growing facility, and additionally being configured to display on the screen an application summary that can be reached directly from the menu, wherein the application summary displays a limited list of data related to or derived from the environmental or plant condition information available within the one or more applications, each of the data in the list being selectable to launch the respective application and enable the selected data to be seen within the respective application, and wherein the application summary is displayed while the one or more applications are in an un-launched state.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Accordingly, these and other objects, along with advantages and features of the present disclosure herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure and are not intended as a definition of the limits of the disclosure. For purposes of clarity, not every component may be labeled in every drawing. In the following description, various embodiments of the present disclosure are described with reference to the following drawings, in which.

DETAILED DESCRIPTION

Figure 1:
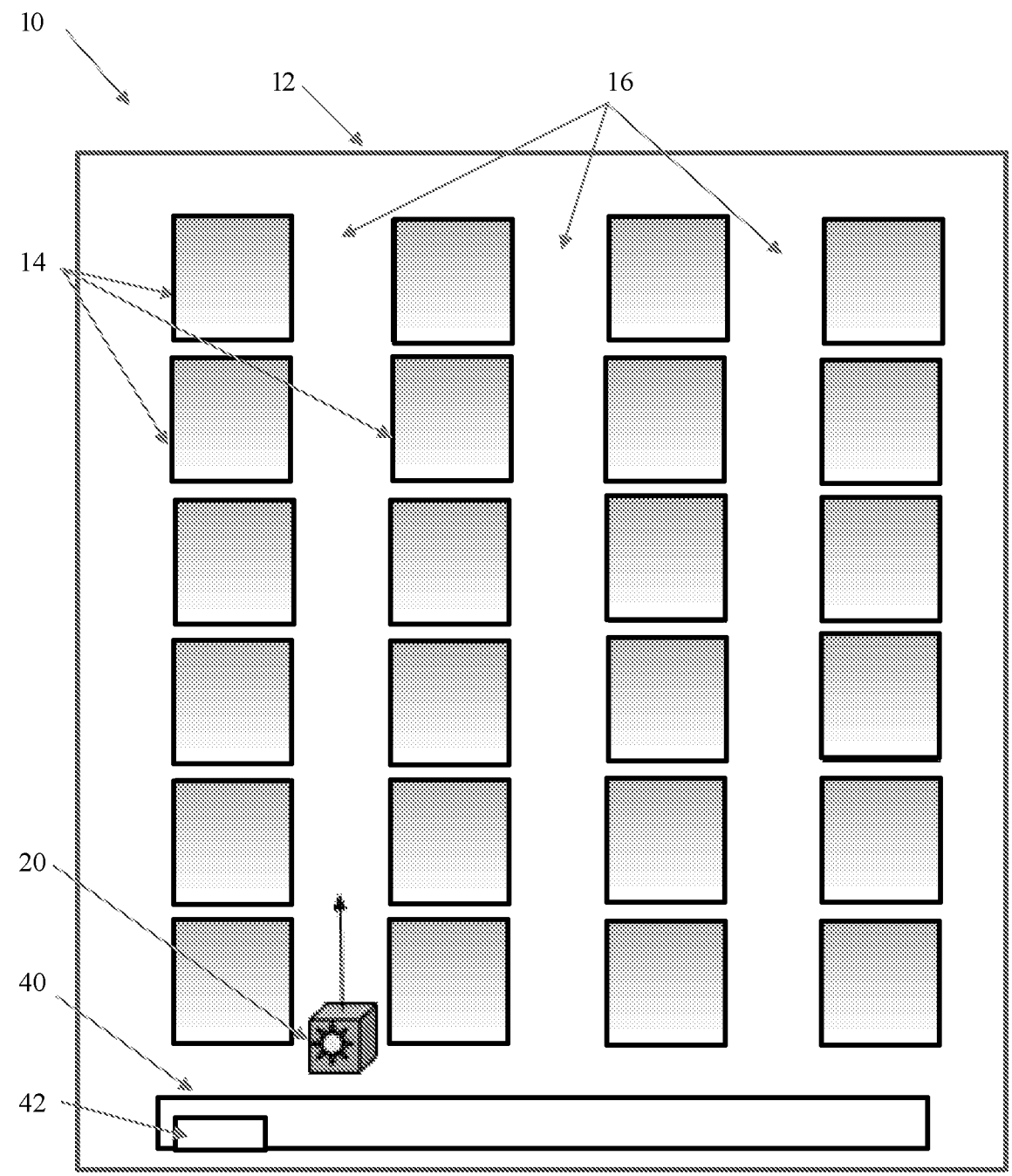
FIG. 1 is a schematic representation of a growing facility in accordance with one or more embodiments of the disclosure.

Reference will now be made to the exemplary embodiments illustrated in the drawings, and specific language will be used here to describe the same. It will nevertheless be understood that no limitation of the scope of the disclosure is thereby intended. Alterations and further modifications of the inventive features illustrated here, and additional applications of the principles of the disclosures as illustrated here, which would occur to one skilled in the relevant art and having possession of this disclosure, are to be considered within the scope of the disclosure.

FIG. 1 is a bird-eye view of a growing facility 10, which can include, for example, a room or region in an indoor or greenhouse cultivation facility, a plot of land, or similar (generally denoted with reference 12). The systems and methods disclosed herein can be applied to virtually any size facility having essentially any layout. In some embodiments, the facility 10 (e.g., a greenhouse) includes one or more benches 14 or other structures (e.g., shelving, crop rows, hanging structures, etc.) that hold, house, or otherwise support the plants in a particular orientation. Generally, the benches/plants will be laid out in a series of rows having access paths 16 located therebetween. While the plants are typically described as laid out in rows, they can also be supported on vertical growing structures, such as tiered benches or vertical farming systems, with the sensing unit 20 navigating accordingly (e.g., moving vertically, horizontally, or diagonally as needed). Typically, the benches and plants are spaced some distance apart along each row and/or vertical tier, which may be determined based on the type of plant, its stage of development, etc. As shown in FIG. 1, there are a series of benches 14, each with one or more plants disposed thereon in different stages of development.

Also shown in FIG. 1 is a mobile sensing unit 20, which is configured to move throughout the facility 10, either autonomously, via human interaction, or both, collecting data from and interacting with the plants, and in some cases, the benches 14, as well. The mobile sensing unit 20 will be described in greater detail with respect to FIGS. 2 and 3. Generally, the mobile sensing unit 20 moves up and down the rows 16, stopping at each bench or specific benches, collecting data from the plant and/or its surroundings, manipulating the plant or bench as necessary, and returning to a home position.

As described in greater detail below, the path of the mobile sensing unit 20 can be navigated via human input and/or autonomously and may be altered based on the data previously collected or certain "triggers" within the facility, such as, optical tags, magnetic tags, color stripes, etc. The mobile sensing unit 20 may also include a positioning system.

Figure 2:
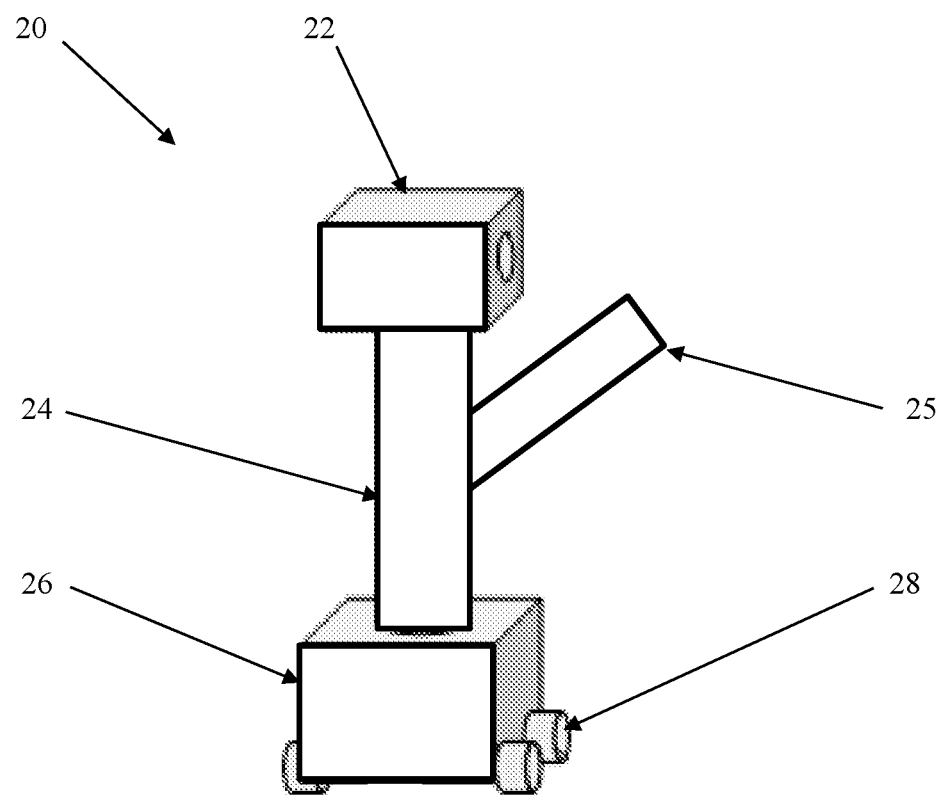
FIG. 2 is a schematic representation of a mobile sensing unit for use in the facility of FIG. 1, or similar facilities, in accordance with one or more embodiments of the disclosure.

An exemplary version of the mobile sensing unit 20 is depicted in FIG. 2. Generally, the unit 20 includes a base 26 that includes a locomotion system 28, such as a set of wheels or tracks coupled to, for example, a motor and/or cables. Other means for propulsion, which would be known to a person of ordinary skill in the art, are contemplated and considered within the scope of the disclosure. The locomotion system 28 can be mechanically or electronically controlled, either by a controller system operated by a human or as controlled by an autonomous navigation algorithm. The locomotion system 28 and propulsion system will be configured to suit a particular application (e.g., size of the growing facility, terrain, environmental conditions, or environmental regulations). The unit 20 also includes a sensing package or array 22 that can include at least one sensing camera, or other data capturing device, and may include depth sensing and other types of optical or environmental sensing devices, as described below. The sensing package 22 can be disposed atop structure 24 extending upwardly from the base 26.

The following is a list of exemplary sensor devices that can be incorporated in to the sensing system 20: CMOS sensors, such as a Blackfly S USB3 (MODEL: BFS-U3-200S6C-C: MP, 18 FPS, SONY IMX183) (see https://www.flir.com/products/blackfly-s-usb3/ ?model=BFS-U3-200S6C-C), Blackfly S Board Level (MODEL: BFS-U3-200S6C-BD2: 20 MP, 17 FPS, SONY IMX183) (see https://www.flir.ca/products/blackfly-s-board-level/?model=BFS-U3-200S6C-BD2); Calibrated Thermal Cameras, such as calibrated and uncalibrated radiometric imagers (see https://infraredcameras.com/thermal-infrared-products/8640-p-series/); line scan cameras and hyperspectral line scan cameras, such as BASLER Racer line scan cameras (see https://www.baslerweb.com/en/products/cameras/line-scan-cameras/); hyperspectral line scanning cameras (see https://www.ximea.com/en/products/xilab-application-specific-oem-custom/hyperspectral-cameras-based-on-usb3-xispec?gclid=CjwKCAiAo7HwBRB KEiwAvC_Q8S7UDCLrZmWn8LZ8ZW61g3GFyyHGF-t2eAPZyd3vSwzr_VbV4UGw4BoCH4IQAvD_BwE); Short-wave infrared cameras, such as SWIR HDR Gated InGaAs camera (see https://axiomoptics.com/11c/widy-swir-ingaas-camera/); optical lens filters, such as band-pass filters (see https://midopt.com/filters/bandpass/) or long-pass filters (see https://midopt.com/filters/longpass/); Machine Vision Camera lenses, such as Azure fixed and vari-focal length lenses see https://www.rmaelectronics.com/azure-lenses/); Multi-spectral camera systems with optical filter wheels (CMOS-based sensors), such as custom or off-the-shelf camera-lens-filter systems (see https://www-.oceaninsight.com/products/imaging/multispectral/spectro-cam/); Multi-spectral cameras using dichroic filter arrays or sensor arrays tuned to specific spectral bands see https://www.oceaninsight.com/products/imaging/multispectral/pixelcam/, https://www.oceaninsight.com/products/imaging/multi-band-sensor/pixelsensor/per-fluorescence-sensor/); Spectrometers and light and PAR sensors (see https://www.oceaninsight.com/products/spectrometers/, https://www.oceaninsight.com/products/systems/, https://www.apogeeinstruments.com/quantum/); Environmental sensors for humidity, temperature and gases (CO2, volatile organic compounds) (see https://www.apogeeinstruments.com/humidity-probes/, https://www.vaisala.com/en/products?mid=%5B876%5D). Additional date capture sensors/devices include stereo camera systems and/or LIDAR (light detection and ranging) systems for three-dimensional (3D) mapping.

In some embodiments, the structure 24 includes means (e.g., a vertical telescopic or scissor lift) for manual or automatic height adjustment of the sensing package 22 (the height adjustment can be manual or electronic by means of an actuator, such as a linear actuator driven by an electric motor or pneumatic pressure) to, for example, capture the optical data of plants of differing size, different locations, or from different perspectives. In an alternative embodiment, the height adjustment is done via a drone system that can launch from and land on the base 26 vertically using, for example, propellers, lighter than air aircraft design, or electro-magnetic force. The navigation system can be shared between the drone and the mobile sensing unit 20. Any of these structures 24 (i.e., actuators or drones) can be manually controlled by a human or electronically controlled with a control unit operated by a human or autonomously using a control algorithm. In addition, the orientation and/or operation (e.g., height, angle, focus, lighting, capture rate, etc.) of any of the cameras or other image/data capture devices can also be controlled mechanically or electronically as described above. In various embodiments, the structure 24 may include a robotic arm 25 extendible therefrom that can be deployed to interact with the plants, benches, or other structures within or part of the facility 10, as known to a person of skill in the art.

Typically, the unit 20 will also include a computing device, which can be located within the base 26 or sensor package 22 with batteries or a cable to connect to a power source. The computing device is configured to capture/store data (e.g., raw data captured by the sensors, data input by a user, or a pre-existing database of domain data) and/or transmit the data to the cloud. This or another computing device may be used for controlling and handling communication between any electronic element in the unit, such as, for example, actuators, cameras (triggering other sensors, communicating with sensors or controller units, etc.). The computing device(s) can be connected to sensors via wires or remotely through wireless communication technologies. In some embodiments, the computing device can be housed elsewhere within the mobile sensing unit 20 or be housed remotely, for example, as a completely separate unit when all communications are wireless. The computing device may or may not perform some preprocessing on the data that is being collected, referred to herein as edge computing.

Figure 3:
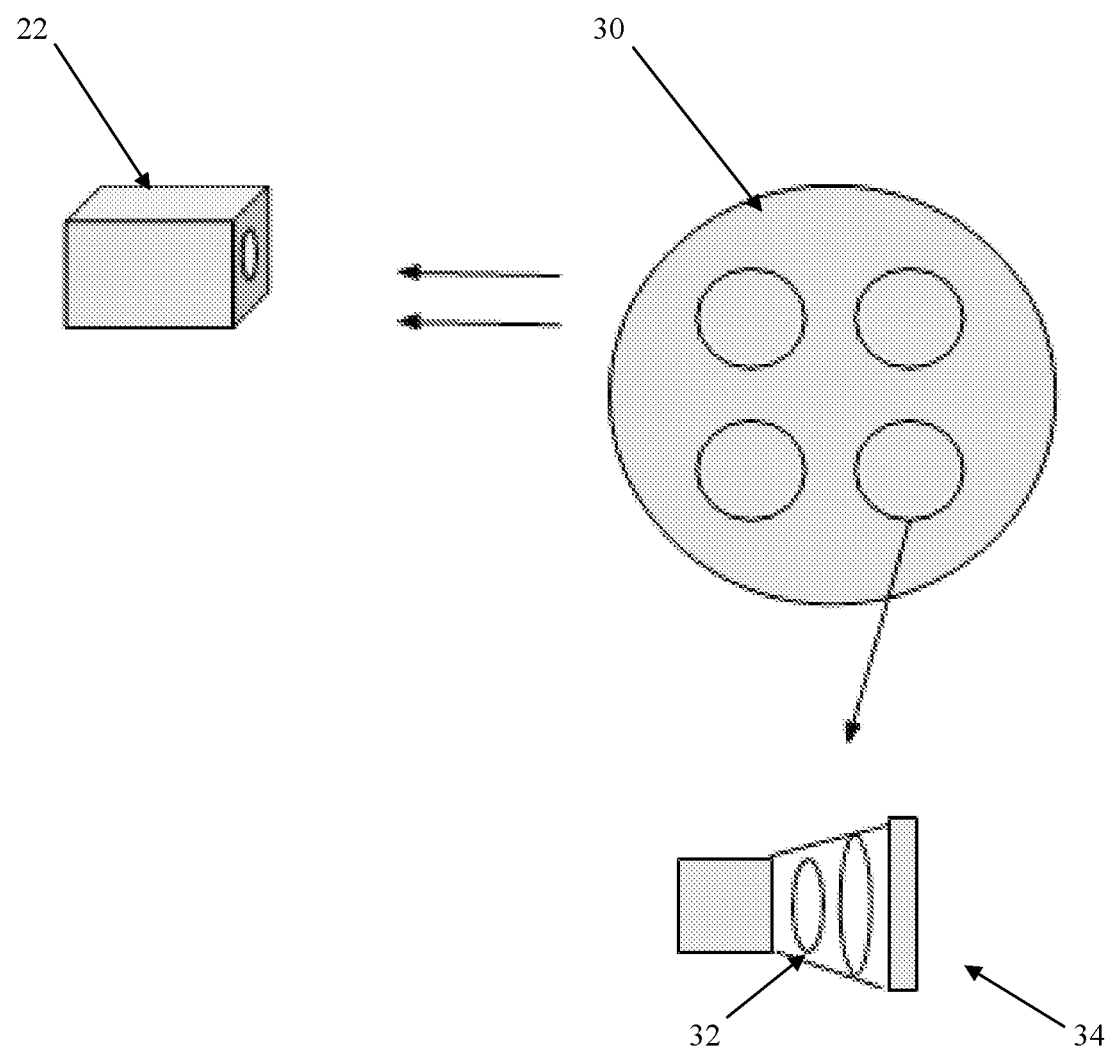
FIG. 3 is a schematic representation of a sensor array for use in the mobile sensing unit of FIG. 2 in accordance with one or more embodiments of the disclosure.

FIG. 3 depicts one embodiment of the sensor package 22 and certain components thereof. A top view of a set of cameras 30, each with a specific lens 32 and a spectral band filter 34; however, in some embodiments, only a single camera can be used in combination with a rotating spectral filter, and/or other sensors as disclosed herein to capture data. Generally, the cameras 30 capture visual features in the visible and invisible spectrum from each plant, such as single or multiple images per plant or a video recording of the plants and/or a scan of the crops and/or growing facility. Each camera unit includes a lens 32 and optionally a filter 34 that can be mounted on the outside or inside of the lens or between the camera and the lens 32. The camera/sensor 30 is connected to a computing device, such as one that is part of the mobile sensing unit 20 or one located remotely (e.g., somewhere in the greenhouse), either wirelessly or via a Universal Serial Bus (USB) connector or Ethernet port.

In an alternative embodiment, a filter wheel that contains filters of different spectral bands is integrated with a camera to allow the camera to capture optical data of different frequency ranges using the same optical sensor. An electro-mechanical system can be used to change the filter position to bring the appropriate filter in front of the camera. Alternatively, the filter 34 may be composed of a material that changes frequency ranges in response to either mechanical pressure or an electromagnetic field applied to it. In some embodiments, the mobile sensing unit 20 includes a flashing system that emits a pulse at or around the time of data capture to sense how a plant responds to a visible or invisible light pulse, referred to herein as active sensing. The flashing system may be part of the sensing package 22 or separate from it.

The mobile sensing unit 20 uses a control system operated by a human or an algorithm or computer software triggered by a human to capture data using the cameras (and/or other sensors) synchronously or asynchronously. Generally, control algorithms use the sensor data collected from visual information in the field of view of the sensors to adjust some of the parameters associated with the mobile sensing unit 20 to optimize the quality of the data collected and/or to navigate the mobile sensing unit, where, for example, the unit 20 operates semi- or fully autonomously. This data is then transferred manually or via cloud to another computing device for further pre-processing and post-processing.

In some embodiments, the sensor array is configured to provide data for Vapor-Pressure Deficit (VPD) mapping. Generally, the array includes one or more thermal cameras that sense short-wave, mid-wave or long-wave infrared spectrum to generate a high-resolution map of temperature variations in the canopy. This data combined with other environmental data can produce an approximation to a high-resolution map of VPD, which is a measure of a plant micro-environment. VPD mapping can be used to highlight and detect regions or "hot-spots" with increased risk for plants to suffer from an undesirable condition, such as powdery mildew. An end-user then can be notified when such conditions are detected, or the system can trigger certain actions manually or autonomously via humans or machines, such as adjusting an environmental variable at plant/bench/room level or directing another device to the affected area to apply a treatment. The aforementioned sensors can also be used to detect particular features of the plants themselves, such as, for example, water stress or signs of pathogens.

In various embodiments, the sensing package 22 may be replaced with a swarm system of small drones, lighter-than-air-aircrafts, or biomimicry flying robots (e.g., having wings instead of propellers). These drones can be equipped with small optical sensing systems that capture optical data at some resolution and at post-processing converts this data into a more enriched version of the entire canopy at plant level or at some other level of granularity. The swarm of robotic flies/drones take off and land from a base that can be similar to the one discussed above with respect to FIG. 2. The drones may be navigated by a central algorithm that navigates them collectively or they can be navigated autonomously by individual/independent control units deployed on a computing device attached to or in communication with the drone. The data captured in real-time from a set of sensors or optical sensors can be fed to this control algorithm to optimize the navigation so as to make sure there are no collisions and to make sure the scan is completed within a desired time and covers all of the areas of interest.

In additional embodiments, the sensing system 20 is configured to perform various data capture steps that provide for plant-level localization for providing plant-level stress mapping and analytics insights to growers to improve cultivation by loss prevention through optimal and targeted treatments. Performing localization processes may further enhance the data and insights by reducing or eliminating errors (e.g., false positives), improving resolution and focus for providing insights to the grower. As previously described, the sensing system 20 scans rows of plants and automatically or manually through the use of human input via software assigns certain location information. This can be done completely manually to completely automated or using a hybrid approach through a combination of techniques including, but not limited to, QR code detection, wheel and visual odometry. In some cases, this step of segmenting the data and assigning it to room/row or more granular regions levels may not be enough to do a 1:1 mapping between raw or processed collected data to individual plants, in which case, 3D mapping can improve this process. Additionally, during data/image collection and/or data/image processing, the system may assign a signature or "fingerprint" to each plant that remains assigned to the plant throughout the various processes and growth phases, such that the system can readily identify a particular plant and/or its location at essentially anytime.

In some embodiments, creating a 3D map of individual plants or pots of plants allows the system/user to detect them in the 3D space. Generally, the term pot is used to designate distinct containers or other unique structures (e.g., hydroponic pods, grow trays, shelves, troughs, etc.) that can be correlated to a particular plant or set of plants. The map can be created using a 3D mapping sensor such as a stereo camera system, LiDAR, or other technologies capable of generating such maps. The fused cloud point of each region of plants can then be segmented before or after preprocessing to correct visual odometry in order to create a cluster of points referring to each plant or pot corresponding to each plant. Next this data is projected into the point-of-view (PoV) from the inferred position of the camera(s) used during the sensing (e.g., as part of 3D scanning or as separate RGB, spectral, or thermal cameras). The projected clusters can then be used as masks for the 2D images collected during the data collection process to provide a 1:1 relationship between individual plants and a subset of data available for each plant in the 2D world.

Other embodiments may use a combination of pot detection as well as inferred plant height profile to generate a simulated model of the individual plant profile before projecting into the 2D point of view of each camera at the time of capture for each capture point. Plant level inferred height profile can be a useful metric to detect growth related characteristics (such as, for example, size, leaf density, growth rate, other nominal features, and anomalies) by itself and can be provided to system users as a 2D or 3D map to high-light regions of interest for treatment, predict growth, and/or to categorize pace of growth for various type of actuations to improve the cultivation operation.

In some embodiments, plant localization approaches include using an IR camera and an RGB camera to collect 2D Images of the plants. A plant mask is created by extracting the pixels associated with plants by, for example, thresholding the pixel values in the image. Specific types of plants may be found using clustering algorithms, such as Kmeans or Hoperaft-Karp. The same plants may be mapped between images using optical flow methods and graphical methods; however, this method has its limitations. For example, images taken of plant canopies are very difficult to segment, even with the human eye. A major reason behind these issues is that the perspective change between images causes the same region of the image to look completely different, resulting in plant segmentations that are not very accurate, often cutting plants in half.

This process may involve creating and fusing two separate point clouds to create a holistic 3D plant and pot profile for the localization purposes and lab calibration techniques used to optimize the fusion parameters and transformation between various camera frames in the 2D and the 3D worlds. Additionally, the depth information can also be overlaid with the 2D pixel values such as spectral RGB and thermal to create an enriched set of data for plant level analytics beyond what a single or set of 2D individual plant data can offer through machine learning techniques, such as various architectures available for 3D convolutional networks. The process may also use QR/April tags, and through real-time detection of those tags, assign the right meta-data about the location where the images where taken and the plants/regions/benches/trays they correspond to. The tags can be detected in the images to help with localization as well as improving the 3D point cloud fusion and addressing noises and artifacts that may arise due to errors in visual odometry.

The data captured and mapped as disclosed above can be used to provide insights to a grower. An auto-scanner records hundreds of gigabytes of data of the plants, etc.; however, the processing of this data is labor intensive if done by hand. Accordingly, as much as possible, the data processing side of providing the data to insight pipeline should be automated, especially, the mapping of plant data.

In some cases, the auto-scanner records plant data based on a timer and without a rigorous mapping between the data recorded and which plant that data is associated with. This means that the insights that the auto-scanner is able to provide has limited precision, specifically for providing insights on a specific plant. While the auto-scanner is able to tell a worker if the plants have an issue, it is not able to tell them which plant. The objective of the data to insights (D2I) pipeline is to connect the raw data generated by the auto-scanner and process it to make plant level insights more accessible. In order to do this the D2I pipeline must include some sort of plant localization, as discussed herein, where plant locations are extracted from raw data generated by the auto-scanner.

In a particular embodiment, the system extends the data from 2D to 3D by using point cloud data, as disclosed above, which allows the system to take advantage of 3D reconstruction algorithms that give data that is relatively consistent across different fields of view. In some cases, this approach includes collecting images of pots (or other containers, etc.) rather than canopy for localization, which allows the system to better estimate plant locations, because the positions are much clearer. Another added advantage is that the system can concatenate the 3D point clouds into a larger bench wide point cloud, allowing the system to analyze the entire bench in one dataset. To further augment the capabilities, the 3D scanning may be done with two cameras. One camera pointing to the canopy and the second camera pointing to the pots, which also allows the system to get a prediction of plant height and also use the pot locations for plant localization. Generally, the process includes creating 3D point cloud reconstruction, mapping point cloud to a world frame, removing distortions introduced by simultaneous localization and mapping (SLAM), extracting pot positions, combining canopy points clouds, and extending solution to two cameras, as described below. In some embodiments, the system uses a depth camera (e.g., the D435i RGBD camera as available from Intel® in Santa Clara, CA) with an onboard inertial measurement unit (IMU) pointed at the plant pots.

To create the 3D point cloud reconstruction, the SLAM algorithm is used and relies on the IMU and visual odometry from the camera. The SLAM algorithm uses Robotic Operating systems (ROS) rtabmap library and outputs a point cloud data (PCD) file, which saves the data as a colored point cloud. One example of a 3D point cloud for a bench is shown at https://share.getcloudapp.com.

Mapping the Point Cloud to a World Frame is carried out in a plurality of steps as follows (see FIGS. 5A-5C). The PCD file is the read using the open3D Python library. The coordinate system of the point cloud 210 has its origin centered at the camera and the axes oriented along the camera look at vector. To better extract insights, the system projects the points into the world frame 200. The coordinate system has the XY plane 202 lying on the table plane, although other systems are contemplated and considered within the scope of the disclosure. Mapping the XY plane onto the table plane includes rotating the axes, globally aligning the measured parameters, estimating the table plane using the least squares, and the local alignment based on a normal vector of the table plane.

The coordinate axis is rotated so that the X axis 202b points along the bench, the Y axis 202a is the camera view at vector and the Z axis 206 points up relative to the camera. Using the camera angle (Beta) and relative height from the camera to the table, the system rotates and translates the coordinate axis accordingly. Global alignment results in the Y axis 202a pointing towards the plants and as parallel to the table plane as possible, with the Z axis 206 pointing up. The XY plane 202 should be as close to the table plane as possible. The table plane is estimated by filtering the point cloud based on the Z coordinate, and keeping points where the absolute value of Z is within some designated or otherwise relevant threshold. The least squares are then used to fit the points to a plane. FIG. 5A also depicts the estimated mesh plane 204. This is before local alignment; thus the coordinate axis is offset from the table plane. FIG. 5B depicts a different view of a similar picture where only the thresholded points are shown and the table plane mesh appears to fit the flat surface created by the points clouds. Local alignment is carried out by calculating a rotation matrix based on a normal vector of the plant. For example, rotate the table plane mesh and then find the Z offset to get a translation vector. With the rotation matrix and translation vector, the system can fine tune the point cloud positions. See FIG. 5C.

Figure 5A:
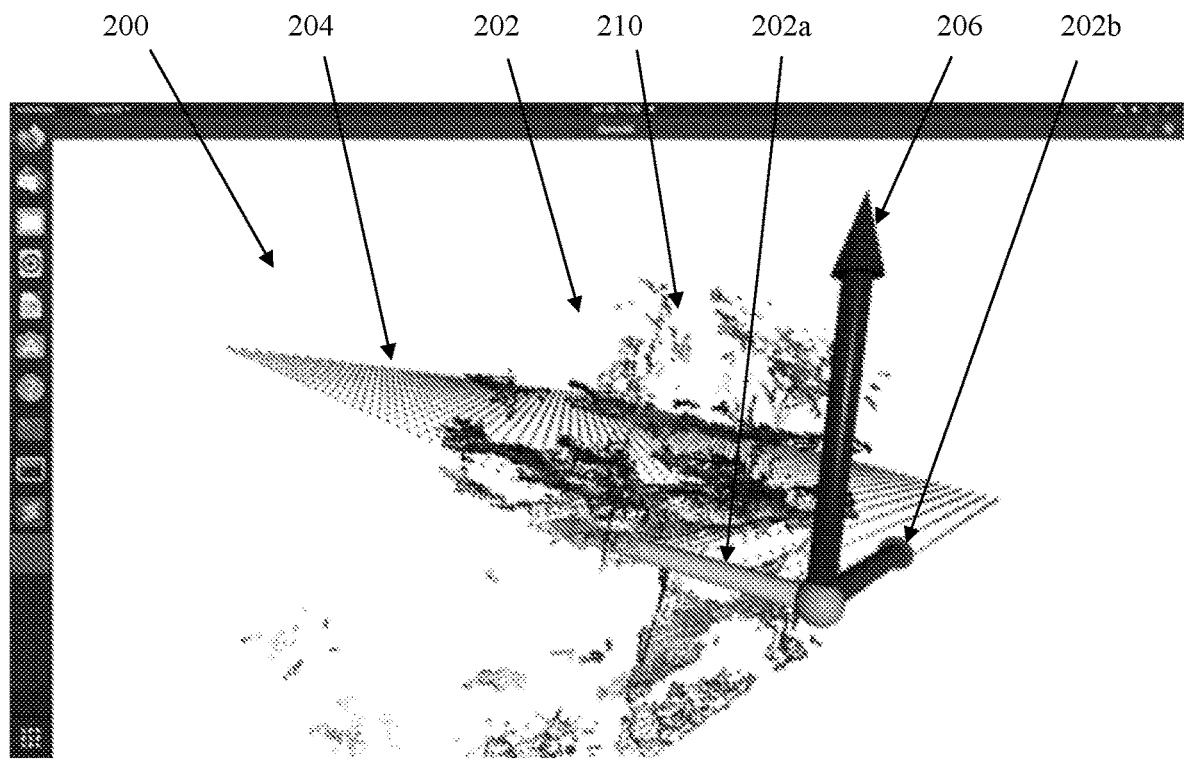
FIGS. 5A-5C are pictorial representations of a process of creating a 3D point cloud reconstruction in accordance with one or more embodiments of the disclosure.
Figure 5B:
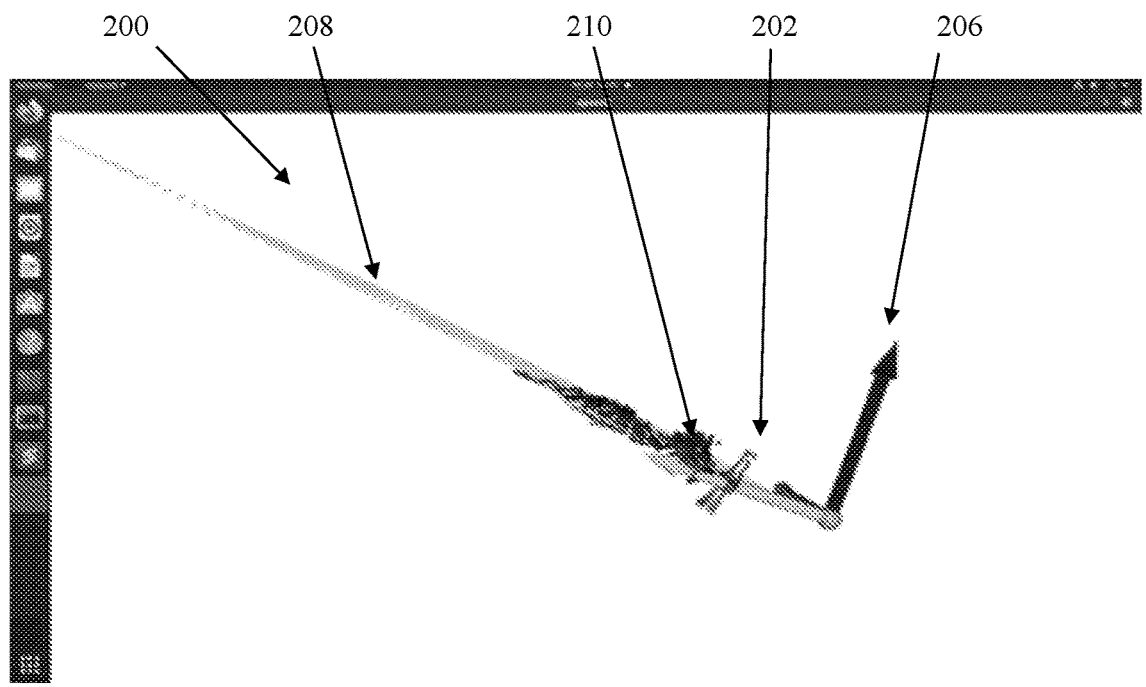
Figure 5C:
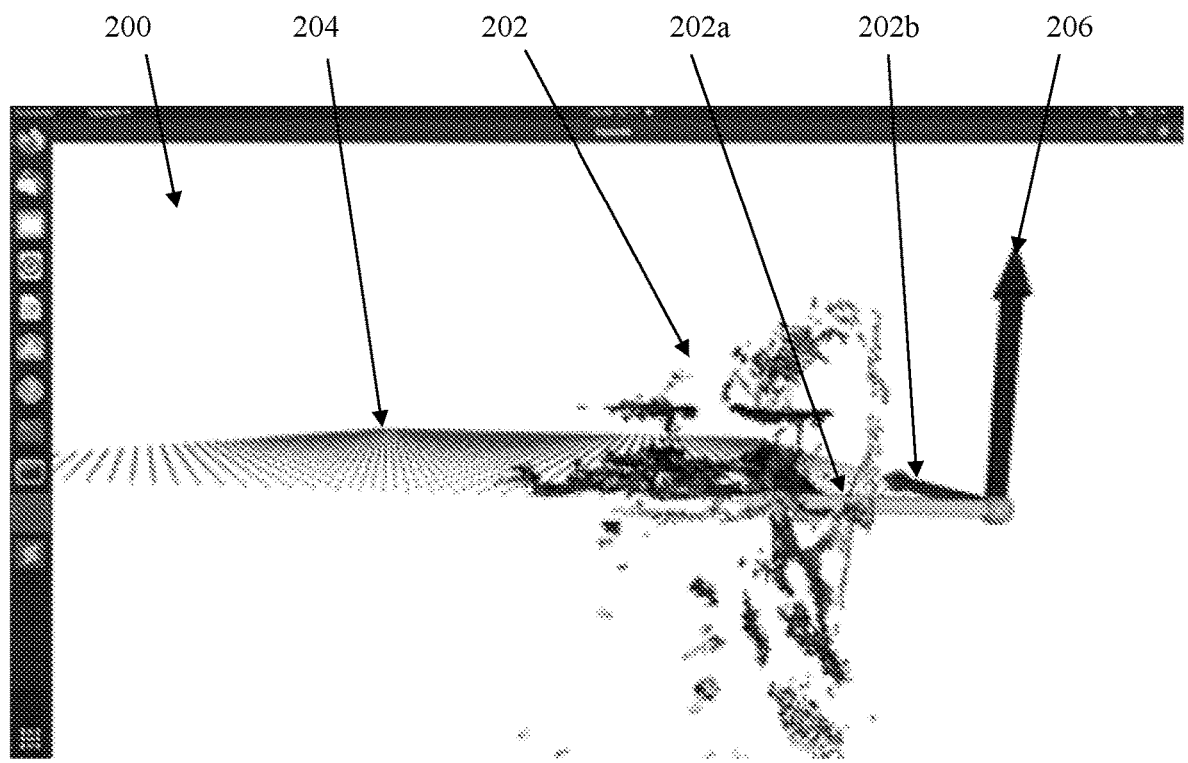

As shown in FIG. 5A, the point cloud is plotted with the table plane mesh 204 (shown in purple). The green arrow 202a (Y axis) is not aligned with the table plane and an offset is illustrated. FIG. 5B depicts an accurate estimation of the table plane despite errors in global alignment, with the thresholded point clouds 210 in brown and the table plane mesh 208 in yellow. After the local alignment step, the misalignment between the coordinate system and the table plane mesh 208 is removed after local alignment. The green arrow should be aligned with the purple mesh 204 and the table in the 3D point cloud as shown in FIG. 5C.

Figure 6A:
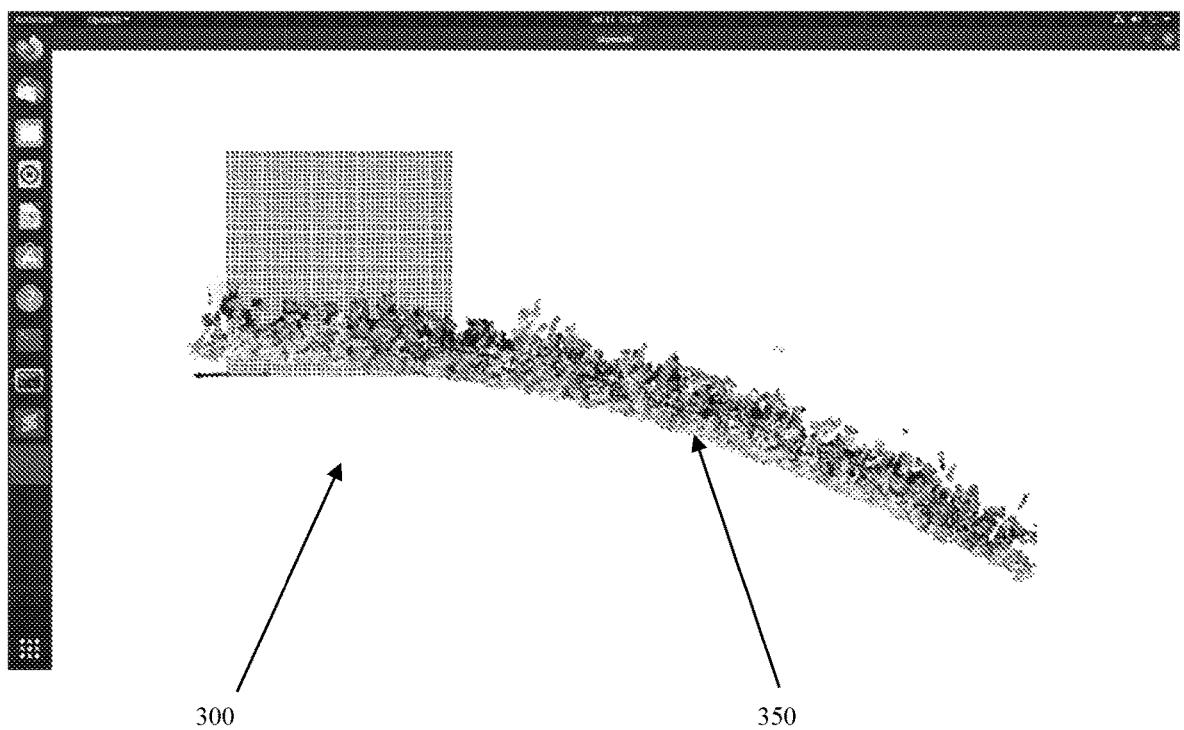
FIGS. 6A and 6B are pictorial representations of a 3D point cloud reconstruction of one plant bench in accordance with one or more embodiments of the disclosure.

The 3D reconstructed scene 300 is generated using a SLAM algorithm that combines the camera IMU and visual odometry. However, errors in pose estimation can build up over time to cause estimated pose to drift from the true pose. This drift 350 is shown in FIG. 6A, which depicts the 3D reconstruction of one plant bench, which is a straight line in real life, but curves across the X-axis. The system is configured to remove the distortions introduced by the SLAM algorithm. The method includes modeling the curved profile of the point clouds as a polynomial curve that is a function of x and finding the transformation that will map these points to a line.

Figure 7:
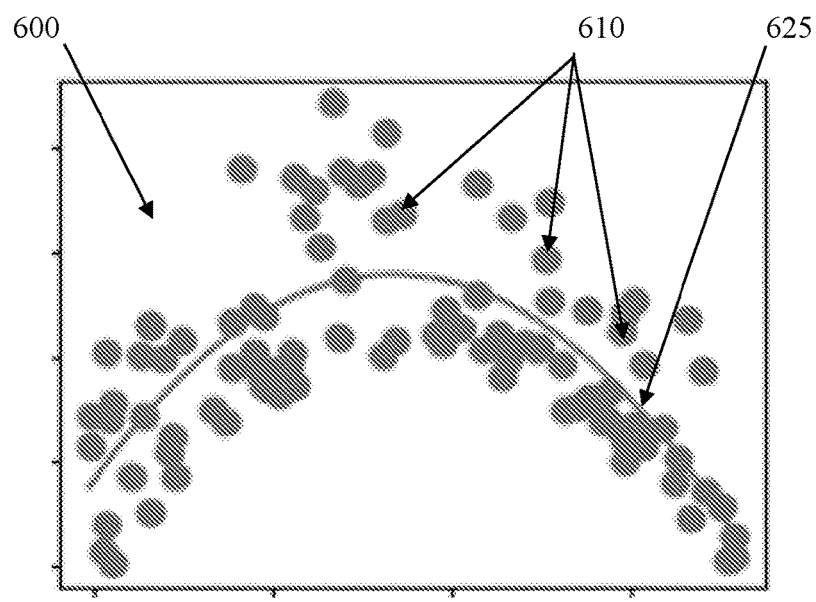
FIG. 7 is a graphical representation of the 3D points mapped into the 2D plane after application of a polynomial degree in accordance with one or more embodiments of the disclosure.

The method includes mapping 3D points to the 2D so that they now sit on the XY plane 600. The Z coordinates of the data are considered to be accurate and can be ignored because of the local alignment step utilized in mapping the point cloud to the world frame. After finding the best fit line for the data, the data is transformed. Obtain the parameters m and b from y=mx+b. Then translate the point cloud so that the best fit line aligns with the x axis. Use a least squares method to find the best fit polynomial to the data. In the example illustrated in FIG. 7, a polynomial degree of 3 was used and shows the sampled 2D points 610 and the fitted polynomial to the curve 625. The points considered for polynomial fitting were randomly sampled with a sample size of 100. The polynomial found p(x) returns y for a value of x.

Figure 6B:
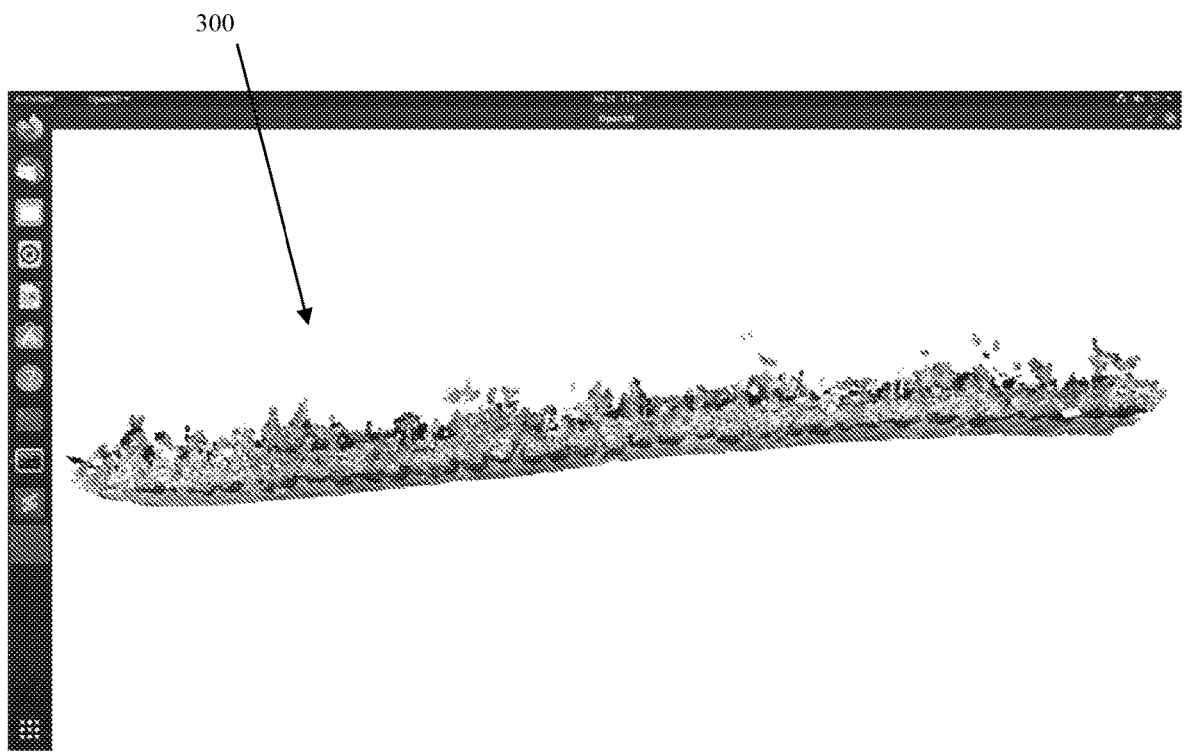

Next, the points are translated according to the polynomial function. Equation: $Y\_f = Y\_0 + f(X\_0)$, where the final point cloud coordinates are $[X\_f, Y\_f, Z\_f]$ and the initial coordinates are $[X\_0, Y\_0, Z\_0]$ and $Z\_f = Z\_0$ and $X\_f = X\_0$. FIG. 6B depicts the 3D transformed point cloud. After the correction, the points clouds are moved so that they are centered along the x axis, which mostly removes the curved distortions. While the larger distortion is removed, there is still an artifact present and the bench is not completely straight. Changing the sampling method/number of samples and/or the polynomial degree that are considered in the fitting of the dataset to a polynomial should improve the result. After this process is carried out, the Z coordinate of each point is preserved. As such, projecting to 3D can be done simply by adding the original Z coordinate to each associated 2D point.

After carrying out the steps described above, the pot positions are relatively easy to extract. To extract the pot positions, the system filters the points so that only the points that are within a certain threshold of the pot rim height are kept. These points can be projected onto the 2D, and then further clustering and filtering is done to extract the pot positions. Specifically, the pot heights can be used as filter points, because the system knows the exact height of the pots it filters points by their z axis values, only keeping points that are within a certain threshold of the pot rim height. The filtered points are projected onto an occupancy grid. For example, the 3D points are mapped to 2D and the system creates a 2D occupancy grid, scaled by the voxel size used to down-sample the 3D points. The 2D points are mapped to a cell in the occupancy grid, where each item in the occupancy grid is either set to 1 or 0 depending on if a 2D point is mapped to it or not.

Next, a clustering algorithm (e.g., the Hoperoft-Karp Clustering Algorithm) is used to generate a list of clusters where cells in the occupancy grid that share an edge are assigned to the same cluster. A typical pot has a certain dimension and when mapped to the occupancy grid, that dimension should correspond to some area value (e.g., right sizes). If it is within some minimum and maximum threshold, it is accepted as a pot. The coordinates of the centroid are chosen as the pot positions. However, if the cluster area is too small compared to a typical pot area, it is rejected. If it is too large, then it is passed for further processing.

In some cases, large clusters could actually be multiple set of pots that just happen to belong to the same cluster when it was projected into 2D. This is likely because the pots were too close to begin with. In order to separate these pots, the system estimates the number of plants using the ratio K, where K is equal to (total_cluster_area)/(typical_pot_area). This is the value of K that is passed into a Kmeans algorithm for segmentation. The Kmeans process should divide up the overlapping clusters into K separate clusters. The centroids of these new clusters are then returned as plant centers. Large cluster processing benefits from tuning of the thresholds from finding the right size clusters and the estimation of the typical pot size.

Figure 8:
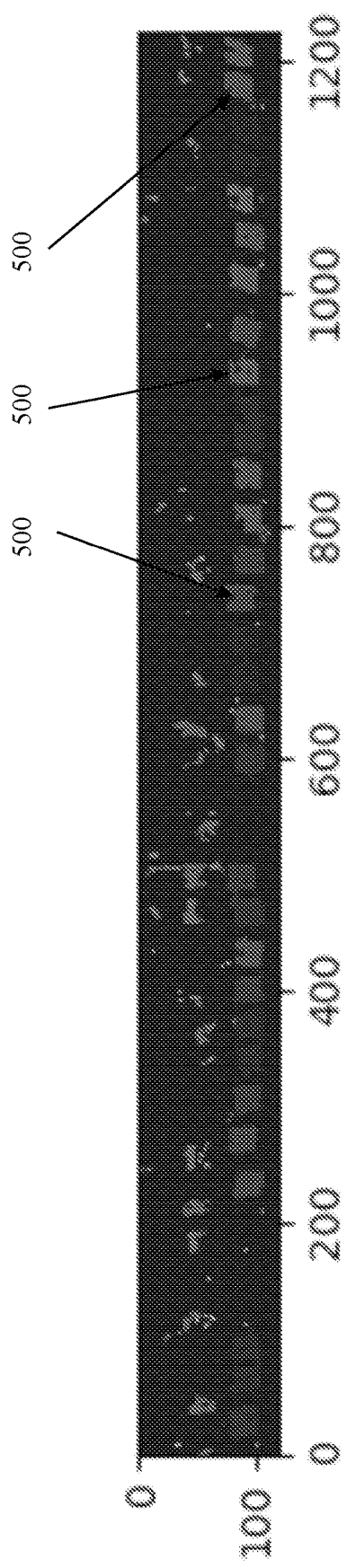
FIG. 8 is a pictorial representation of two plots showing a scanned section of a growing facility before and after filtering and segmentation of the data in accordance with one or more embodiments of the disclosure.
Figure 8:
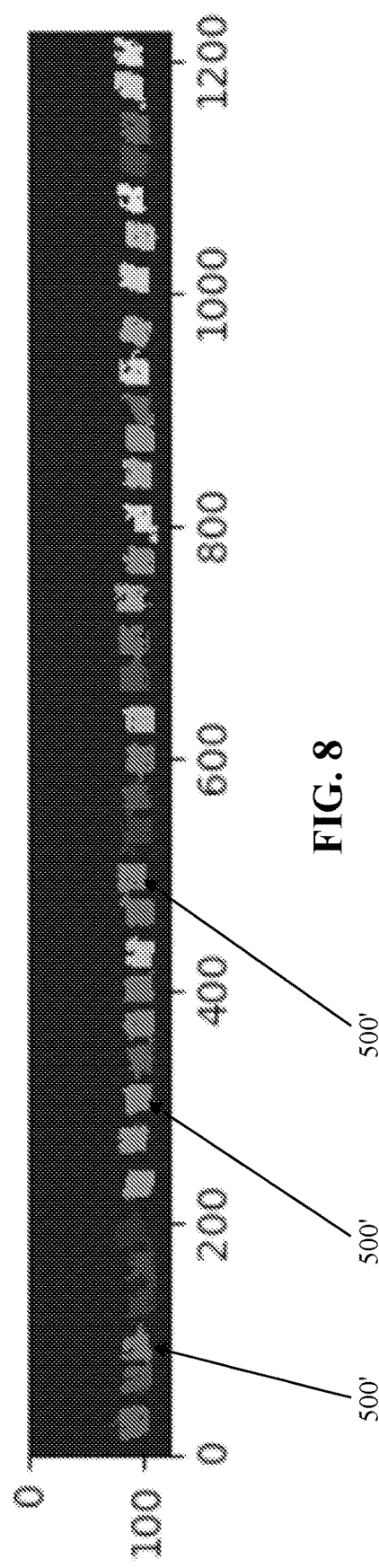
Figure 9:
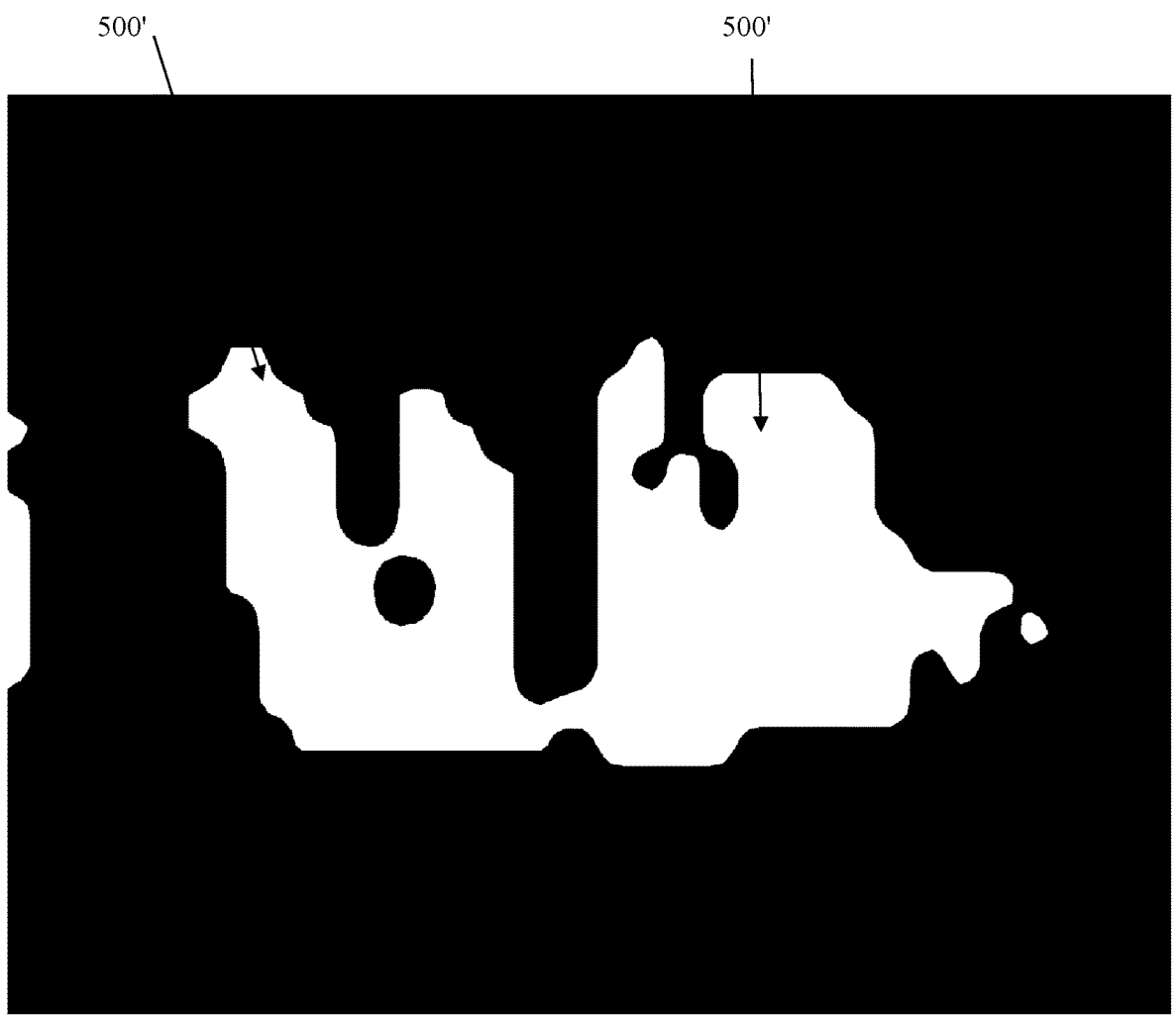
FIG. 9 is an enlarged pictorial representation of abutting clusters generated via a Kmeans algorithm in accordance with one or more embodiments of the disclosure.

The result of this process is shown in FIG. 9, while FIG. 8 depicts the occupancy grid after application of the clustering algorithm (top plot) and the Kmeans algorithm (bottom plot). Specifically, the top plot of FIG. 8 depicts the clustered occupancy grid and includes a lot of small clusters that are not pots. The bottom plot of FIG. 8 depicts the clustered occupancy grid after filtering and segmentation based on area, where only cells that confidently correspond to pots are colored. The different colors are used to distinguish between different pots. FIG. 9 is a close-up of a cluster that is touching (technically two abutting clusters) and was originally recognized as only a single cluster after using the Hoperaft-Karp algorithm. The Kmeans algorithm is able to segment the abutting clusters into two separate clusters.

The images captured, generated or otherwise derived from the captured images may be further enhanced by, for example, using two cameras (e.g., both on the sensing unit 20, one camera located on the sensing unit 20 and a second camera or cameras located throughout the facility, or any number of cameras on individual drones). In order to infer plant height from the 3D reconstruction, the system can use data from the point cloud of the canopy and integrate these two sets of point clouds. In some cases, this also results in a curved profile that might not necessarily match the profile of the pot scene, making it difficult to directly transform the points into the correct position. In some embodiments, a new point cloud topic is created in ROS that has the integrated point clouds from the pot camera point of view. The SLAM mapper is used to map this point cloud. The method takes segments of the canopy point cloud and uses the iterative closest point (ICP) or random sample consensus (RANSAC) algorithm to match them in the right place; however, incorrect matching may occur. This may be improved by overlap between the two points clouds, with greater overlap resulting in fewer errors. In this method, the ROS code uses the rtab_map library and the launch file is based off the demo_two_kinect.launch: link.

Figure 10:
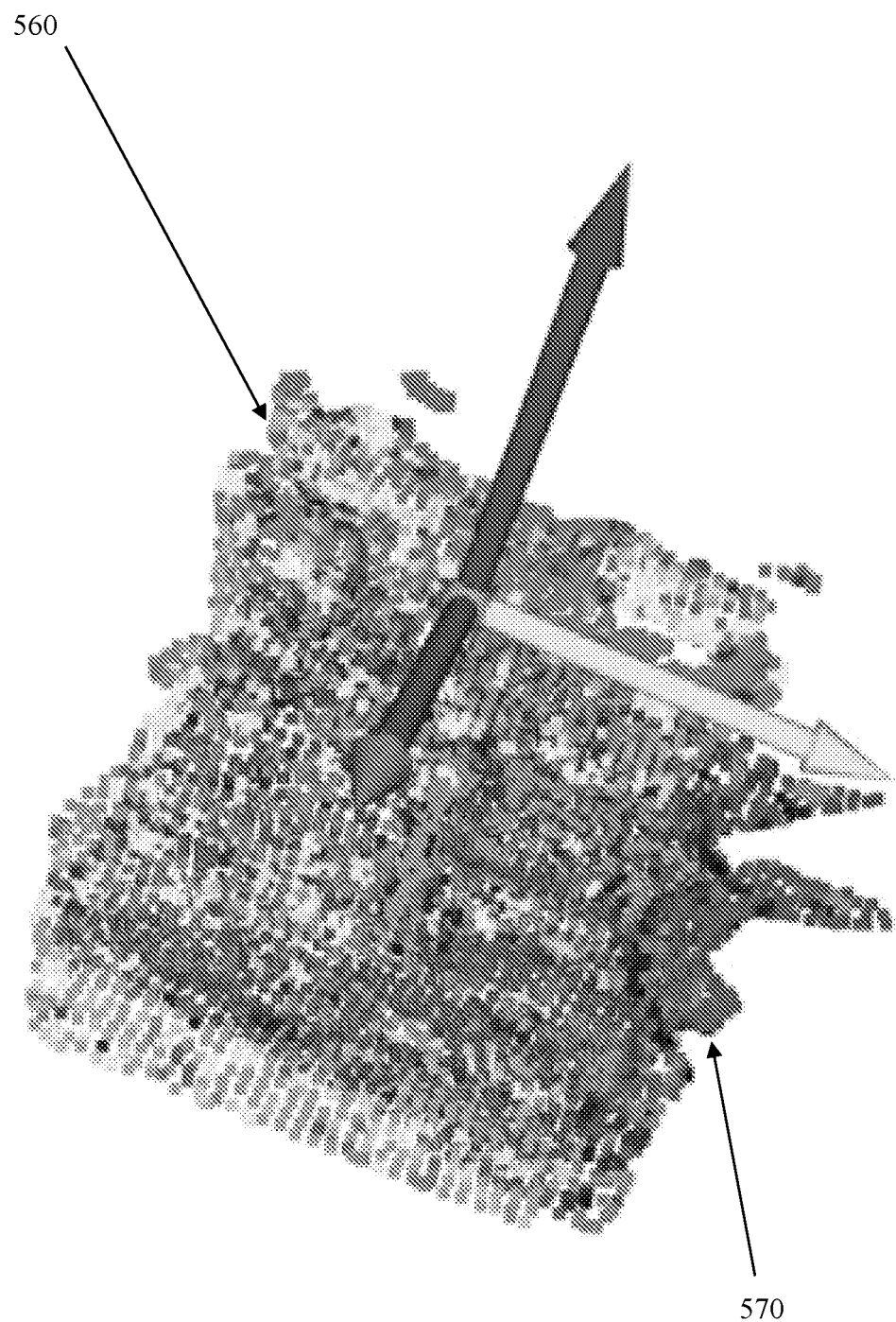
FIG. 10 is a pictorial representation of aligned point clouds in accordance with one or more embodiments of the disclosure.

The transformation between the two cameras must be accurate in order to combine the two sets of point clouds. Manually measuring the transform between the two cameras is both cumbersome and prone to errors, because the positions of the cameras have to be adjusted often to accommodate different data capturing scenarios. Accordingly, measuring the transform every time is very labor intensive and undesirable and, therefore, a computational approach is used. The computational approach uses the open3D registration library for RANSAC and ICP to find the transformation between two sets of point clouds. The result of running this algorithm is shown in FIG. 10. As shown, the two previously unaligned point clouds 570, 560 (shown in red and teal) are aligned. This computed transform needs to be converted into the ROS coordinate system. A library called pyrealsense, which was used to save the point clouds for calibration, saves the point clouds using a different coordinate system than the one dual camera ROS program uses for the 3D Reconstruction. In FIG. 10, the red, green, and blue arrows correspond to the x- y- and z-axes.

The navigation strategy may be dictated autonomously or via human input. The navigation may be altered based on the data collected previously using the same sensors or using a different sensing system. The navigation system/strategy can also utilize an indoor positioning system that may be used in addition to other methods to associate each piece of recorded data with a specific location or plant. Additionally, optical printed tags or RFID tags may be used on each plant to associate the optical data with a certain plant, or a location within the facility. Magnetic or color stripes can also be used (e.g., attached to the ground or other structure within the facility) to help the navigation system guide the unit 20.

In various embodiments, the growing facility may include various mechanisms (e.g., an actuator) that the mobile sensing unit 20 can interact with to adjust some characteristic or other variable feature of the growing facility. For example, the mobile sensing unit 20 could interact with (e.g., via a robotic arm 25 or a wireless control signal) one or more actuators or drivers coupled to the benches or doors to adjust a spacing between aisles to allow the unit 20 to enter a specific area or to allow the unit 20 to enter or exit a certain room. In other examples, the unit 20 could adjust an environmental setting within the facility or a specific area thereof, such as increasing or decreasing temperature, humidity, or lighting levels.

Figure 4:
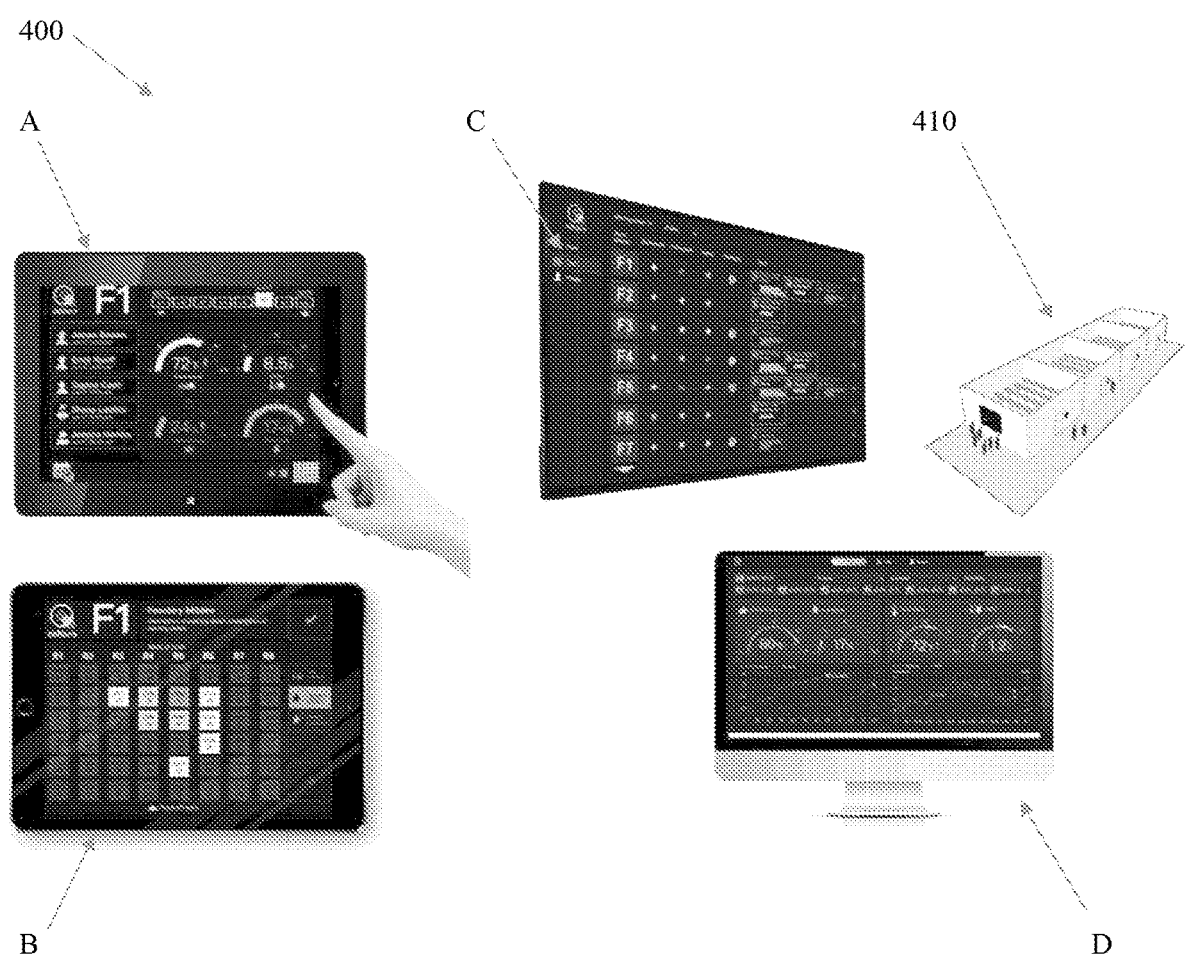
FIG. 4 is a pictorial representation of a series of graphical user interfaces configured for displaying data to a user in accordance with one or more embodiments of the disclosure.

FIG. 4 depicts a series of graphical user interfaces (GUI) 400 that can be configured to deliver data and insight to an end user (e.g., a customer, a cultivator, or operator of a cultivation facility). Generally, the data and insight outputs are generated by the systems described herein, with, in certain embodiments, essentially instantaneous delivery of insights while collecting the data. These outputs are then delivered via a custom-designed software user interface, an example of which as shown in FIG. 4. The custom software can be web-based, hosted on a cloud-based software system, and connected to a pre-existing database of domain data, model outputs, recommendations, etc. that are part of the system. In some embodiments, the GUI 400 can be part of the mobile sensing unit 20, can be located remotely, or both. For example, the GUI 400 can be mounted outside each growing area (a room or greenhouse section) or be incorporated into a free-roaming mobile devices, such as tablet devices and smart phone devices. Furthermore, the GUI 400 can be interactive allowing an end user to cycle through different sets of data, run diagnostics, update the insights, or just input data generally.

The GUI can be accessed in two primary functional forms. The software interface can be run on a tablet device(s) 400A, 400B, 400C, which can be mounted outside a growing facility (410 in FIG. 4). The GUI 400 presents a series of screens (i.e., pages) that provide cultivators working in the facility access to information about the environmental and plant conditions inside the growing facility (e.g., temperature, plant health status including presence of stress, disease or pests, plant performance (e.g., growth status, yield predictions). These conditions can be the present conditions, historical conditions, or comparisons thereof (e.g., a graphical representation of a growth cycle of a plant and the environmental conditions during the cycle). The GUI can present these insights and data at different scales, including an overview of the room or growing area and more detailed "bench-level" (including plant-level) information presented in a grid or matrix that mimics the layout of the facility and crop. This allows the cultivators to understand the status of the crops, while minimizing human exposure to the crops. It also allows the end user to track and manage cultivation tasks via targeted and time-optimized methods, rather than blanketed treatments and ad-hoc timing.

Alternatively or additionally, the GUI can be accessed through desktop or laptop computer(s) (400D) to provide the same information as described above, but can also include additional data representations and time-series trend analysis that visualizes crop performance (health, yield, instances of stress, instances of environmental issues that affect plant growth) and can be filtered and viewed based on metadata fields (strain, crop cycle or number, room/facility area) and includes cultivation task records that are also visualized based on time-series, man-hours or crop cycles (e.g., plant de-leafing tasks performed, integrated pest management tasks scheduled and performed, water and nutrient treatments, soil amendments etc.). This data is used by the end users to analyze cultivation procedures and practices, optimize human resources and minimize exposure, and perform proactive supply planning.

Additional aspects of the systems described herein can be coupled with a conveyor system 40 (see FIG. 1) that can be configured to handle the plants or benches to, for example, reorient or relocate them. In some cases, the plants may be moved to allow for additional data collection. In some embodiments, the conveyor system 40 includes one or more conveyor belts (or other transport mechanism, such as an overhead crane, cable-driven parallel robots, or sliding benches) coupled with any necessary drive systems. The conveyor system 40 can be incorporated with a sensing system 42, such as the mobile sensing unit 20 or a separate sensing unit 42 disposed on the conveyor system 40. In one aspect, a conveyor system 40 and sensing system 42 is configured for pre-harvest or post-harvest predictive grading, issue/anomaly detection, etc.

In certain embodiments, a sensing unit 42 mounted on a conveyor belt scans plants that are transported by or otherwise presented to the sensing unit at a certain pace. The plants may be introduced to the conveyor belt by actuators incorporated within the conveyor system design. The conveyor belt can route different plants to different locations based on a decision made by a human after seeing insights acquired through the crop-scanning software through an interface (such as the GUIs described above) or an algorithm can autonomously navigate the plants to different locations based on the insights it gets from the results of the scans (e.g., the data captured via the sensing unit and processed for quality grading predictions or stress/anomaly/disease detection).

In various embodiments, the sensing unit 42 can be attached to a robotic arm or an actuator that allows the sensing unit to capture two-dimensional and three-dimensional data from the entire 360-degree field of view. In some embodiments, the conveyor belt may be designed to rotate the plants for this to happen. The conveyor belt can also exist to navigate post-harvest material and a similar scanning system can be mounted to collect scans on the belt throughput. Again, an algorithm may be used to actuate different robotic parts in the conveyor system or separate robotic arms to route material to different locations or to apply certain agents or environmental conditions to different plants or areas.

The data captured (and processed) by the sensing unit can be associated with the post-harvest data collected at various stages of material processing. This data can then be used for supervised or unsupervised training of statistical/machine learning models for quality grading/scoring. Additionally, the data collected by the sensing unit from all the post-harvest plant material, which will be processed for extraction together at a later time, can be used for inference and prediction of yield quality and volume, can be used to modify the recipe of how the material will be processed in the following steps in the entire process of delivering it to an end-user or a customer, or inform any decisions made throughout that process such as pricing, etc.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives.

Furthermore, those skilled in the art should appreciate that the parameters and configurations described herein are exemplary and that actual parameters and/or configurations will depend on the specific application in which the systems and techniques of the disclosure are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto; the disclosure may be practiced other than as specifically described.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

What is claimed is:

1. A computer-implemented method for processing crop information, the method implementing an application processing system for use in generating and processing information related to environmental and plant conditions within a growing facility and displaying same, the method comprising:
    generating raw data via a mobile sensing unit, where the raw data corresponds to one or more characteristics of one or more plants;
    receiving user input information in one of multiple available input formats through an input interface;
    processing the raw data and user input information to create a curated data set comprising processed images representative of the crop information,
    wherein processing the raw data further comprises creating at least one 3D point cloud reconstruction and mapping the at least one 3D point cloud reconstruction to a World Frame; performing a localization process to enhance the quality of the displayed information; wherein the localization process comprises creating and fusing two separate point clouds to create a holistic 3D plant and pot profile;
    comparing the curated data set against a pre-existing database of domain data;
    determining, based at least in part on the comparison of the curated data set, the specific environmental and plant conditions relative to the crop being processed;
    generating a graphical user interface using a GUI generator; and
    displaying the information related to the environmental and plant conditions.

2. The method of claim 1, wherein the graphical user interface is interactive and the method further comprises manipulating displayed information.

3. The method of claim 1, wherein a first point cloud comprises canopy-level data and a second cloud point comprises plant-level data.

4. The method of claim 1, wherein the localization process comprises mapping a graphical representation of the 3D points into a 2D plane after application of a polynomial degree.

5. The method of claim 1, wherein the localization process comprises concatenating at least two 3D point cloud reconstructions into a wide point cloud for analyzing an entire facility or bench with one dataset.

6. The method of claim 1, wherein generating raw data further comprises capturing spectral RGB images and thermal images.

7. The method of claim 1, wherein generating raw data further comprises capturing a QR code or an April tag in real-time and assigning location and/or plant meta-data to a corresponding captured image.

\* \* \* \* \*